United States Patent
Chen et al.

(10) Patent No.: US 10,464,297 B2
(45) Date of Patent: Nov. 5, 2019

(54) METHOD AND DEVICE FOR ATTACHING BACKING FILM TO FLEXIBLE SUBSTRATE AND ROLLER

(71) Applicant: BOE Technology Group Co., Ltd., Beijing (CN)

(72) Inventors: Liqiang Chen, Beijing (CN); Hong Li, Beijing (CN); Baoming Cai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 19 days.

(21) Appl. No.: 15/522,355

(22) PCT Filed: May 3, 2016

(86) PCT No.: PCT/CN2016/080877
§ 371 (c)(1),
(2) Date: Apr. 27, 2017

(87) PCT Pub. No.: WO2017/133092
PCT Pub. Date: Aug. 10, 2017

(65) Prior Publication Data
US 2018/0104943 A1     Apr. 19, 2018

(30) Foreign Application Priority Data

Feb. 4, 2016  (CN) .......................... 2016 1 0080733

(51) Int. Cl.
*B32B 37/00* (2006.01)
*B32B 37/10* (2006.01)
*B32B 38/00* (2006.01)

(52) U.S. Cl.
CPC .......... *B32B 37/0053* (2013.01); *B32B 37/10* (2013.01); *B32B 38/0004* (2013.01); *B32B 2457/20* (2013.01)

(58) Field of Classification Search
CPC . B32B 37/0053; B32B 37/10; B32B 2457/20; B32B 38/0004; Y10T 156/1054
See application file for complete search history.

(56) References Cited

U.S. PATENT DOCUMENTS 5,058,497 A * 10/1991 Bishop ................ B29C 63/0004
                                                        100/155 R
6,182,546 B1 * 2/2001 Hecker ................ B26D 1/0006
                                                        83/365
(Continued)

FOREIGN PATENT DOCUMENTS

CN    101992558 A    3/2011
CN    102173171 A    9/2011
(Continued)

OTHER PUBLICATIONS

Second Office Action for Chinese Patent Application No. 201610080733. X, dated Nov. 17, 2017, 5 pages.
(Continued)

*Primary Examiner* — Mark A Osele
*Assistant Examiner* — Christopher C Caillouet
(74) *Attorney, Agent, or Firm* — Westman, Champlin & Koehler, P.A.

(57) ABSTRACT

A method and a device for attaching a backing film to a flexible substrate and a roller for use therewith. The method includes placing the flexible substrate on a surface of a first worktable facing a second worktable and placing the backing film on a surface of the second worktable facing the first worktable; pressing the flexible substrate and the backing film by a rolling mechanism to attach them together. The rolling mechanism includes a roller having a surface encapsulated with segmented roller encapsulating rubber.

11 Claims, 2 Drawing Sheets

(56) References Cited

U.S. PATENT DOCUMENTS

| | | | |
|---|---|---|---|
| 8,893,758 B2 | 11/2014 | Genssen | |
| 9,244,307 B2 | 1/2016 | Hada et al. | |
| 2002/0148333 A1* | 10/2002 | Myers | B23D 21/00 82/113 |
| 2012/0000602 A1 | 1/2012 | Kim et al. | |
| 2016/0282643 A1 | 9/2016 | Ai | |
| 2016/0339680 A1 | 11/2016 | Wang et al. | |

FOREIGN PATENT DOCUMENTS

| | | |
|---|---|---|
| CN | 103448346 A | 12/2013 |
| CN | 203545266 U | 4/2014 |
| CN | 203739372 U | 7/2014 |
| CN | 104169787 A | 11/2014 |
| CN | 104407739 A | 3/2015 |
| CN | 104678619 A | 6/2015 |
| CN | 104760395 A | 7/2015 |
| CN | 204605117 U | 9/2015 |
| CN | 105513500 A | 4/2016 |
| DE | 102010013711 A1 | 10/2011 |
| JP | 2002-72181 A | 3/2002 |

OTHER PUBLICATIONS

First Office Action from Chinese Patent Application No. 201610080733.X, dated Sep. 1, 2017, 13 pages.

International Search Report and Written Opinion, including English translation of Box No. V of the Written Opinion, for International Application No. PCT/CN2016/080877, dated Nov. 9, 2016, 12 pages.

English translation of International Search Report and Written Opinion for International Application No. PCT/CN2016/080877, dated Nov. 9, 2016, 9 pages.

* cited by examiner

METHOD AND DEVICE FOR ATTACHING BACKING FILM TO FLEXIBLE SUBSTRATE AND ROLLER

CROSS-REFERENCE TO RELATED APPLICATION

This application is a national phase application from PCT/CN2016/080877 filed on May 3, 2016 and claims the benefit of Chinese Patent Application No. CN201610080733.X filed on Feb. 4, 2016 in the State Intellectual Property Office of China, the whole disclosure of which is incorporated herein by reference.

BACKGROUND OF THE INVENTION

Field of the Invention

Embodiments of the disclosure relate to the field of display technique, in particular to a method and a device for attaching a backing film to a flexible substrate and a roller.

Description of the Related Art

With the development of the display technique, more and more electronic devices employ flexible substrates which are light, thin and have good impact resistance. A display device utilizing the flexible substrate includes a liquid crystal display device, an organic electroluminescence display device and an electrophoretic display device. A flexible display device may be applied to a smart card, a portable computer and an electrical paper. Currently, the process for manufacturing flexible displays has developed greatly. In general, the flexible substrate is firstly fixed on a glass substrate, and then backing plate preparing process is performed. This process is compatible with the preparing process of the existing liquid crystal display device. After the preparing is completed, it is necessary to separate the flexible substrate from the glass substrate and then attach a film sheet (a backing film) to a back surface of the flexible substrate so as to make the flexible substrate flat. Thereafter, processes such as a cutting process, a flexible circuit board bonding process.

Typically, the backing film is attached to the flexible substrate by means of a roller, i.e., exerting a pressing force to the flexible substrate placed on an upper worktable and the backing film placed on a lower worktable by a roller to attach them with each other. In such an attaching device, a roller is encapsulated on an external surface thereof with roller encapsulating rubber made of organic material with elasticity. During the attaching, due to the action of the exerted pressure, the roller is deformed when being subjected to stress, which results in too great deformation at both sides of the roller encapsulating rubber, thereby generating accumulation so that the pressure is too large. Further, both the flexible substrate and the backing film are made of organic material, thus they will also be deformed when being subjected to pressing force. Therefore, when both sides of the roller encapsulating rubber are deformed greatly, the resultant excessive pressure will cause irreversible deformation of the flexible substrate and the backing film, which may cause the flexible substrate after the attaching process varies in size due to large pressure variation. Further, the subsequent bonding process of the flexible substrate to the flexible circuit board is sensitive to variation of the flexible substrate in size. Therefore, the variation of the flexible substrate in size will result in problems such as misplacement of a terminal on the substrate with a terminal of the flexible circuit board, circuit failure when bonding, thereby severely influencing product yield. For high generation production line, the size of the substrate increases, and the size of the roller will increases accordingly, the above problem is more severe.

Therefore, a technical problem to be solved in the art is how to improve uniformity of exerting force when attaching the backing film to the flexible substrate so as to improve uniformity of the size of the flexible substrate after attaching the backing film.

SUMMARY OF THE INVENTION

Embodiments of the discourse provide a method and device for attaching a backing film to a flexible substrate to eliminate the defect in the prior art that the flexible substrate after attaching the backing film has a large size variation duo to non-uniform force exerted to the flexible substrate when attaching the backing film.

According to an exemplary embodiment of the disclosure, there is provided a method for attaching a backing film to a flexible substrate comprising: placing the flexible substrate on a surface of a first worktable facing a second worktable and placing the backing film on a surface of the second worktable facing the first worktable; pressing the flexible substrate placed on the first worktable and the backing film placed on the second worktable with a rolling mechanism to attach them together, wherein the rolling mechanism comprises a roller having a surface encapsulated with segmented roller encapsulating rubber.

In an embodiment of the disclosure, the method further comprises providing a cutter wheel between two adjacent segments of the roller encapsulating rubber on the roller to cut the flexible substrate placed on the first worktable and the backing film placed on the second worktable during pressing.

According to another exemplary embodiment of the disclosure, there is provided a device for attaching a backing film to a flexible substrate, comprising a first worktable, a second worktable and a rolling mechanism, wherein the flexible substrate is placed on a surface of the first worktable facing the second worktable; the backing film is placed on a surface of the second worktable facing the first worktable; the rolling mechanism is configured to press and attach the flexible substrate placed on the first worktable and the backing film placed on the second worktable, wherein the rolling mechanism comprises a roller having a surface encapsulated with segmented roller encapsulating rubber.

In an embodiment of the disclosure, in the above device, a cutter wheel is disposed between two adjacent segments of the roller encapsulating rubber on the roller to cut the flexible substrate placed on the first worktable and the backing film placed on the second worktable during pressing.

In an embodiment of the disclosure, the cutter wheel is higher than the roller by no more than 1 mm.

In an embodiment of the disclosure, the first worktable has a recess at a position corresponding to each cutter wheel.

In an embodiment of the disclosure, the rolling mechanism comprises a pressure means, a base and a roller bearing, wherein the base is configured to fix the roller bearing and the pressure means, the pressure means is configured to provide pressing force for the rolling mechanism, and the roller bearing is configured to drive the roller encapsulated with the segmented roller encapsulating rubber to roll so as to press and attach the flexible substrate placed on the first worktable and the backing film placed on the second worktable.

In an embodiment of the disclosure, the pressure means comprises a cylinder and/or a servo motor.

In an embodiment of the disclosure, a spacer is disposed between two adjacent segments of the roller encapsulating rubber.

In an embodiment of the disclosure, both the roller encapsulating rubber and the spacer are made of polyurethane, and the material of the spacer is softer than that of the roller encapsulating rubber.

In an embodiment of the disclosure, a length of each segment of the roller encapsulating rubber is about one quarter or one half of a length of a side of the flexible substrate.

In an embodiment of the disclosure, an edge of each segment of the roller encapsulating rubber is located outside a display substrate on the flexible substrate.

According to yet another exemplary embodiment of the disclosure, there is provided a roller having a surface encapsulated with segmented roller encapsulating rubber.

DETAILED DESCRIPTION OF PREFERRED EMBODIMENTS OF THE INVENTION

A method and a device for attaching a backing film to a flexible substrate according to embodiments of the disclosure will be described in detail below with reference to the accompanying drawings.

Figure 1:
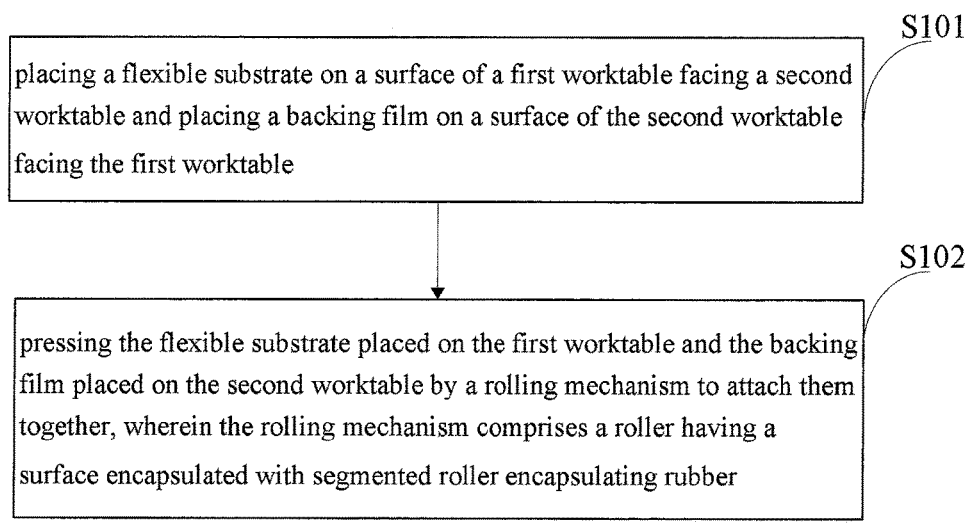
FIG. 1 is a flow chart of a method for attaching a backing film to a flexible substrate according to an exemplary embodiment of the disclosure.

According to an exemplary embodiment of the disclosure, as shown in FIG. 1, there is provided a method for attach a backing film to a flexible substrate comprising:

S101: placing the flexible substrate on a surface of a first worktable facing a second worktable and placing the backing film on a surface of the second worktable facing the first worktable;

S102: pressing the flexible substrate placed on the first worktable and the backing film placed on the second worktable by a rolling mechanism to attach them together, wherein the rolling mechanism includes a roller having a surface encapsulated with segmented roller encapsulating rubber.

In the above method for attaching the backing film to the flexible substrate according to the embodiment of the disclosure, by using a rolling mechanism including a roller having a surface encapsulated with segmented roller encapsulating rubber to press a flexible substrate and a backing film to attach the backing film to the flexible substrate, it is possible to release stress by segmenting the roller encapsulating rubber, thereby reducing pressure accumulated at both sides of the roller encapsulating rubber when the roller is subjected to a force. Compared with the prior art in which a rolling mechanism including a roller having a surface encapsulated with a single unitary roller encapsulating rubber is used to press and attach the flexible substrate and the backing film, in the embodiments of the present disclosure, the flexible substrate and the backing film are pressed and attached by a rolling mechanism including a roller having a surface encapsulated with segmented roller encapsulating rubber. In this way, it is possible to distribute pressure to prevent too great deformation stress from being generated at both sides of the single unitary roller encapsulating rubber so as to improve the uniformity of the force exerted to the flexible substrate when pressing and attaching the flexible substrate and the backing film, thereby improving the uniformity of the size of the flexible substrate after attaching the backing film.

As an example, the first worktable may be set as an upper worktable, and the second worktable may be set as a lower worktable. Alternatively, the second worktable may be set as the upper worktable, and the first worktable may be set as the lower worktable. The present invention is not limited thereto. The following embodiments will be described by an example in which the first worktable is an upper worktable and the second worktable is a lower worktable.

In a specific embodiment, the method according to the above embodiment of the disclosure may further comprise: providing a cutter wheel between two adjacent segments of roller encapsulating rubber on the roller to cut the flexible substrate placed on the upper worktable and the backing film placed on the lower worktable during pressing. Since both the backing film and the flexible substrate are made of organic material, they will be deformed when being subjected to a force, which may result in stress accumulation. Therefore, in order to reduce the deformation of the flexible substrate when being attached with the backing film, it is possible to additionally provide a cutter wheel between the two adjacent segments of roller encapsulating rubber. When pressing and attaching the flexible substrate and backing film by the roller, the cutter wheels will firstly contact the backing film and the flexible substrate to cut them into strips. As the pressure increases, the roller will contact the backing film to press and attach it to the flexible substrate. In this way, it is possible to prevent a problem that a large backing film and a large flexible substrate are deformed when being subjected to a pressing force.

Figure 2:
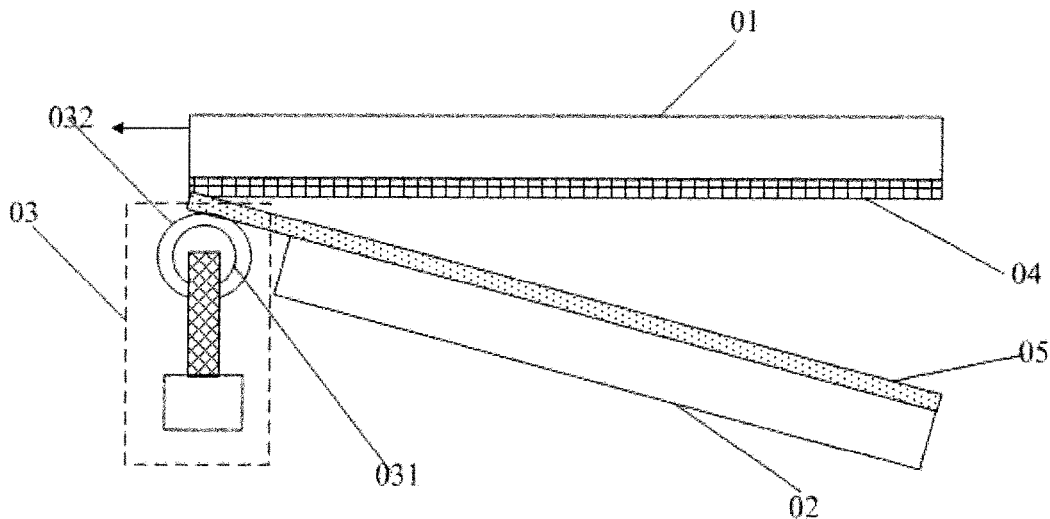
FIG. 2 is a schematic structural view of a device for attaching a backing film to a flexible substrate according to an exemplary embodiment of the disclosure.
Figure 3:
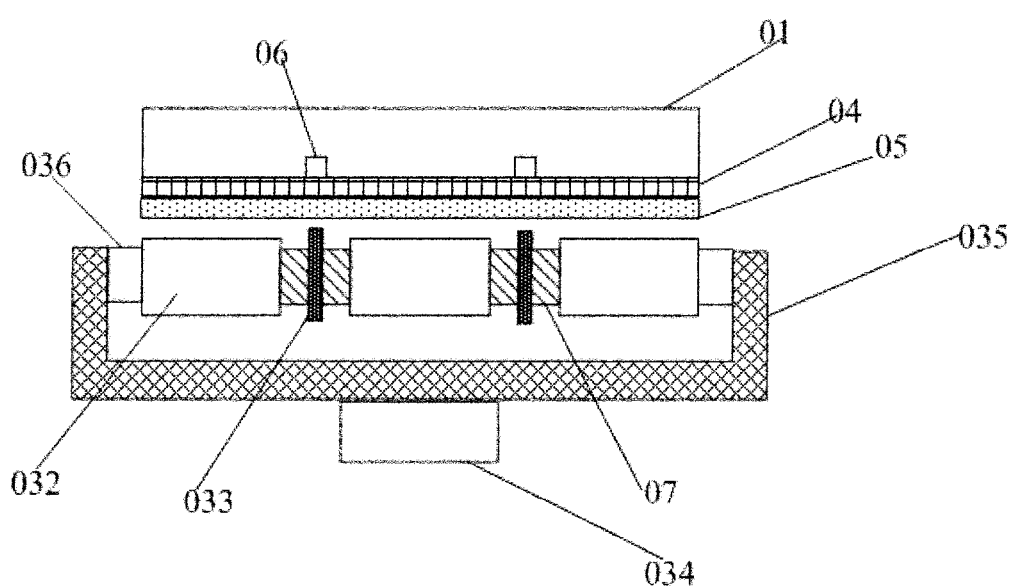
FIG. 3 is another schematic structure view of the device for attaching a backing film to the flexible substrate according to an exemplary embodiment of the disclosure.

Based on the same concept, according to an exemplary embodiment, as shown in FIG. 2, there is provided a backing film attaching device of a flexible substrate comprising an upper worktable 01, a lower worktable 02 and a rolling mechanism 03. The flexible substrate 04 is placed on a surface of the first worktable 01 facing the second worktable 02, and a backing film 05 is placed on a surface of the second worktable 02 facing the first worktable 01. The rolling mechanism 03 is used to press and attach the flexible substrate 04 placed on the first worktable 01 and the backing film 05 placed on the second worktable 02. As illustrated in FIG. 3, the rolling mechanism 03 includes a roller 031 (shown in FIG. 2) having a surface encapsulated with segmented roller encapsulating rubber 032.

In the above backing film attaching device of the flexible substrate according to the embodiment of the disclosure, the flexible substrate and the backing film are pressed and attached together by the rolling mechanism including the roller having the surface encapsulated with the segmented roller encapsulating rubber. Particularly, when pressing and attaching the flexible substrate and the backing film, the upper worktable may move horizontally. The flexible substrate and the backing film may be initially adsorbed to the upper worktable and lower worktable by means of vacuum adsorption, respectively. As shown in FIG. 2, the backing film and the flexible substrate are contacted and attached with each other at the roller. Then, during pressing the flexible substrate and the backing film to attach them together, a vacuum adsorption device for the lower worktable is turned off, and the upper worktable is maintained in a vacuum adsorption state. In this way, as the roller rolls, the upper worktable moves in a direction denoted by the arrow shown in FIG. 2, and the backing film and the flexible substrate are pressed and attached together and the backing film moves along with the upper worktable and is removed from the lower worktable slowly, thereby realizing the attachment of the backing film and the flexible substrate. It is possible to release stress by using the roller with segmented encapsulating rubber to press and attach the backing film and the flexible substrate, thereby reducing pressure accumulated at both sides of the roller encapsulating rubber when the roller is subjected to a force. Compared with the prior art in which a rolling mechanism including a roller having a surface encapsulated with a single unitary roller encapsulating rubber is used to press and attach a flexible substrate and a backing film, in the embodiments of the present disclosure, by using a rolling mechanism including a roller having a surface encapsulated with segmented roller encapsulating rubber to press and attach he flexible substrate and the backing film, it is possible to distribute the pressure to prevent too great deformation stress from being generated at both sides of the single unitary roller encapsulating rubber, so as to improve the uniformity of the force exerted to the flexible substrate when pressing and attaching the flexible substrate and the backing film, thereby improving the uniformity of the size of the flexible substrate attached with the backing film.

In an embodiment, a shown in FIG. 3, a cutter wheel 033 may be disposed between two adjacent segments of roller encapsulating rubber 032 on the roller 031 to cut the flexible substrate 04 placed on the upper worktable 01 and the backing film 05 placed on the lower worktable (shown in FIG. 2) during rolling. Particularly, since both the backing film and the flexible substrate are made of organic material, they will generate deformation when being subjected to a force, which may result in stress accumulation. Therefore, in order to reduce the deformation of the flexible substrate when being attached with the backing film, it is possible to additionally provide a cutter wheel between the two adjacent segments of roller encapsulating rubber. When pressing and attaching the flexible substrate and backing film by the roller, the cutter wheels will firstly contact the backing film and the flexible substrate to cut them into strips. The roller then will contact the backing film to press and attach the backing film to the flexible substrate as the pressure increases. In this way, it is possible to prevent a large backing film and a large flexible substrate from being deformed when being subjected to a force.

In a particular implementation, the cutter wheel is higher than the roller, and the height difference therebetween is no more than 1 mm By controlling the height difference between the cutter wheel and the roller within 1 mm, during attaching, the cutter wheels will firstly contact the backing film and the flexible substrate to cut then into strips. Then, as the pressure increases, the roller will contact the backing film to press and attach it to the flexible substrate.

In a particular implementation, as shown in FIG. 3, the upper worktable 01 has a recess 06 at a position corresponding to each cutter wheel 033. Each recess 06 may be engaged with its respective cutter wheel 033. In order to ensure that the cutter wheels smoothly cut the flexible substrate and the backing film into the strips, it is necessary to provide the recesses engaging with the respective cutter wheels in the upper worktable. In this way, when cutting with the cutter wheels, each cutter wheel can enter its respective recess to smoothly perform the cutting so as to cut the flexible substrate and the backing film into the strips. As the pressure increases, the roller will contact the backing film to press and attach it to the flexible substrate. In this way, it is possible to prevent a large backing film and a large flexible substrate from being deformed when being subjected to a force.

In a particular implementation, as shown in FIG. 3, the rolling mechanism 03 may comprise a pressure means 034, a base 035 and a roller bearing 036. The base 035 is configured to fix the roller bearing 036 and the pressure means 034. The pressure means 034 is configured to provide a pressing force for the rolling mechanism to perform the pressing and attaching, and the roller bearing 036 is configured to drive the roller 031 (shown in FIG. 2) encapsulated with the segmented roller encapsulating rubber 032 to roll so as to press and attach the flexible substrate placed on the upper worktable and the backing film placed on the lower worktable. In particular, the surface of the roller of the rolling mechanism is encapsulated with the segmented roller encapsulating rubber, the pressure means provides the pressure for pressing and attaching, and the rolling bearing drives the roller to roll to contact with the backing film, thereby pressing and attaching the backing film to the flexible substrate. At the same time, through encapsulating the surface of the roller with segmented roller encapsulating rubber, it is possible to distribute the pressure to prevent accumulated pressure from being generated due to too great deformation of the both sides of the roller encapsulating rubber when the roller is subjected to a force, which avoids non-uniformity in the size of the flexible substrate after attaching the backing film due to non-uniform force exerted to the flexible substrate when being attached with the backing film.

In a particular implementation, the pressure means may include a cylinder and/or a servo motor. That is, the cylinder or the servo motor or the combination thereof may be used to provide the pressing force for pressing and attaching the flexible substrate and the backing film. Of course, other pressure means for providing the pressing force may be used, and the present invention is not limited thereto.

In a particular implementation, as shown in FIG. 3, a spacer 07 may be disposed between two adjacent segments of roller encapsulating rubber 032. Particularly, in the above device according to the embodiment of the disclosure, the spacer may be disposed between the two adjacent segments of roller encapsulating rubber to isolate the two adjacent segments of roller encapsulating rubber so as to reduce the deformation generated by mutual squeeze of the two adjacent segments of roller encapsulating rubber when being subjected to a force, thereby ensuring the surface of the roller can provide uniform pressure.

In a particular implementation, in the above device according to the embodiments of the disclosure, both the roller encapsulating rubber and the spacer are made of polyurethane, and the material of the spacer is softer than that of the roller encapsulating rubber. In particular, both the roller encapsulating rubber and the spacer can be made of polyurethane, which has elasticity and can expel air bubbles during pressing and attaching. In addition, the same material will have different softness after different treatment processes. Therefore, the spacer can be softer than the roller encapsulating rubber. In this way, when the spacer isolates two adjacent segments of roller encapsulating rubber, it is possible to reduce the deformation generated by mutual squeeze of the two adjacent segments of roller encapsulating rubber when being subjected to a force, thereby ensuring the surface of the roller can provide uniform pressure.

In a particular implementation, in the above device according to the embodiments of the disclosure, a length of each segment of roller encapsulating rubber may be one quarter or one half of a length of a side of the flexible substrate. Particularly, in order to adapt to various size specifications of the flexible substrate, the size of the segmented roller encapsulating rubber may be determined based on the size of the flexible substrate. Since products are arranged symmetrically in a high generation production line, the size of each segment of the roller encapsulating rubber can be set to correspond to the size of one half or one quarter of the flexible substrate on a high generation production line, so that an edge of each segment of the roller encapsulating rubber is located outside each display substrate on the flexible substrate (the uncut flexible substrate includes a plurality of display substrates arranged in a form of a matrix) to avoid stress distribution inside the display substrates from being influenced when attaching the backing film. At the same time, it is possible to press and attach backing film and the flexible substrate corresponding to products of different sizes. Further, for products of different sizes, it is possible to manufacturing rollers with roller encapsulating rubber of different sizes for replacement, and the disclosure is not limited herein.

According to embodiments of the disclosure, there is provided a method and a device for attaching a backing film to a flexible substrate. The method comprises: placing the flexible substrate on a surface of a first worktable facing a second worktable and placing the backing film on a surface of the second worktable facing the first worktable; pressing the flexible substrate placed on the first worktable and the backing film placed on the second worktable by a rolling mechanism to attach them together, wherein the rolling mechanism includes a roller having a surface encapsulated with segmented roller encapsulating rubber. By using a rolling mechanism including a roller having a surface encapsulated with segmented roller encapsulating rubber to press and attach the flexible substrate and the backing film, it is possible to release stress by segmenting the roller encapsulating rubber, thereby reducing pressure accumulated at both sides of the roller encapsulating rubber when the roller is subjected to a force. Compared with the prior art in which a rolling mechanism including a roller having a surface encapsulated with a single unitary roller encapsulating rubber is used to press and attach a flexible substrate and a backing film, in the embodiments of the present disclosure, the flexible substrate and the backing film are pressed and attached by a rolling mechanism including a roller having a surface encapsulated with segmented roller encapsulating rubber. In this way, it is possible to distribute pressure to prevent too great deformation stress from being generated at both sides of the single unitary roller encapsulating rubber so as to improve the uniformity of the force exerted to the flexible substrate when pressing and attaching the flexible substrate and the backing film, thereby improving the uniformity of the size of the flexible substrate after attaching the backing film.

According to an exemplary embodiment of the disclosure, there is further provided a roller having a surface encapsulated with segmented roller encapsulating rubber.

Obviously, various changes and modifications may be made to the disclosure without departing from the spirit and scope thereof. If these changes and modifications of the disclosure fall within the scope of claims and their equivalents, the disclosure is intended to include these changes and modifications.

What is claimed is:

1. A device for attaching a backing film to a flexible substrate, comprising a first worktable, a second worktable and a rolling mechanism, wherein
   the flexible substrate is placed on a surface of the first worktable facing the second worktable;
   the backing film is placed on a surface of the second worktable facing the first worktable;
   the rolling mechanism is configured to press the flexible substrate placed on the first worktable and the backing film placed on the second worktable to attach them together, wherein the rolling mechanism comprises a roller having a surface encapsulated with segmented roller encapsulating rubber,
   wherein a cutter wheel is disposed between two adjacent segments of the segmented roller encapsulating rubber on the roller and configured to cut the flexible substrate placed on the first worktable and the backing film placed on the second worktable during rolling.

2. The device according to claim 1, wherein the cutter wheel is higher than the roller by a height no more than 1 mm.

3. The device according to claim 2, wherein the first worktable has a recess at a position corresponding to each cutter wheel to cooperate with the cutter wheel.

4. The device according to claim 3, wherein the rolling mechanism comprises a pressure means, a base and a roller bearing, and wherein
   the base is configured to fix the roller bearing and the pressure means,
   the pressure means is configured to provide a pressing force for the rolling mechanism to perform the pressing and the attaching by the roller thereof, and the roller bearing is configured to drive the roller encapsulated with the segmented roller encapsulating rubber to roll so as to press and attach the flexible substrate placed on the first worktable and the backing film placed on the second worktable.

5. The device according to claim 2, wherein the rolling mechanism comprises a pressure means, a base and a roller bearing, and wherein
   the base is configured to fix the roller bearing and the pressure means,
   the pressure means is configured to provide a pressing force for the rolling mechanism to perform the pressing and the attaching by the roller thereof, and
   the roller bearing is configured to drive the roller encapsulated with the segmented roller encapsulating rubber to roll so as to press and attach the flexible substrate placed on the first worktable and the backing film placed on the second worktable.

6. The device according to claim 1, wherein the rolling mechanism comprises a pressure means, a base and a roller bearing, and wherein
   the base is configured to fix the roller bearing and the pressure means,
   the pressure means is configured to provide a pressing force for the rolling mechanism to perform pressing and attaching by the roller thereof, and
   the roller bearing is configured to drive the roller encapsulated with the segmented roller encapsulating rubber to roll so as to press and attach the flexible substrate placed on the first worktable and the backing film placed on the second worktable.

7. The device according to claim 6, wherein the pressure means comprises a cylinder and/or a servo motor.

8. The device according to claim 6, wherein a spacer is disposed between two adjacent segments of the segmented roller encapsulating rubber.

9. The device according to claim 8, wherein both the roller encapsulating rubber and the spacer are made of polyurethane, and a material of the spacer is softer than that of the roller encapsulating rubber.

10. The device according to claim 9, wherein a length of each segment of the segmented roller encapsulating rubber is about one quarter or one half of a length of a corresponding side of the flexible substrate.

11. The device according to claim 1, wherein an edge of each segment of the segmented roller encapsulating rubber is substantially located outside a display substrate on the flexible substrate.

* * * * *